Dec. 13, 1966  B. G. BRAY ETAL  3,290,890
SEPARATION OF H₂S FROM HYDROCARBON IN A GAS-SOLID SYSTEM
Filed March 27, 1964  2 Sheets-Sheet 1

INVENTORS.
BRUCE G. BRAY
GEORGE W. SWIFT
BY
Henry H. Huth
ATTORNEY

INVENTORS
BRUCE G. BRAY
GEORGE W. SWIFT
BY
*Henry H. Huth*
ATTORNEY

United States Patent Office 3,290,890
Patented Dec. 13, 1966

3,290,890
SEPARATION OF H₂S FROM HYDROCARBON IN A GAS-SOLID SYSTEM
Bruce G. Bray, Ponca City, Okla., and George W. Swift, Lawrence, Kans., assignors to Continental Oil Company, Ponca City, Okla., a corporation of Oklahoma
Filed Mar. 27, 1964, Ser. No. 355,237
8 Claims. (Cl. 62—12)

This invention relates to the sweetening of sour hydrocarbon gases; more particularly it relates to low temperature separation of hydrogen sulfide from admixture with normally gaseous hydrocarbon.

Natural gas and refinery gas are now widely used as sources of energy and as raw materials for petrochemical production. These gases as obtained normally are sour, i.e. contain hydrogen sulfide in objectionable amounts; some carbon dioxide is commonly also present. Hydrogen sulfide presents a pipeline corrosion and an odor problem; strict limitations have been placed on the $H_2S$ content of natural gas which is to be transported by pipelines—not more than 0.25 grain per 100 standard cubic feet of gas. Gas for petrochemical end-use must in many instances be even purer with respect to hydrogen sulfide.

Several processes are known for separating hydrogen sulfide from admixture with normally gaseous hydrocarbons, e.g., the amine process and the hot carbonate process. The present versions of the hot carbonate process are limited to feeds containing relatively small amounts of hydrogen sulfide. The amine process can handle large contents of hydrogen sulfide but the cost of operation increases rapidly with increasing $H_2S$ content.

The hydrogen sulfide recovered can be used as a source of $SO_2/SO_3$ for sulfuric acid manufacture. The catalytic reduction of hydrogen sulfide to elemental sulfur requires the hydrogen sulfide feed to have a hydrocarbon content below about 5 mole percent. A low hydrocarbon content is also desired for chemical usage of hydrogen sulfide.

Low temperature processing of sour natural gas to separate hydrogen sulfide is known. These processes have complications in the separation operation itself or require after-separation of the hydrogen-sulfide stream to decrease the hydrocarbon content.

An object of the invention is a simple process for separating hydrogen sulfide from sour hydrocarbon gas— specifically a low temperature process—containing substantial, and even major, amounts of $H_2S$. Another object is such a low temperature process which produces directly a hydrogen sulfide product of low hydrocarbon content. Other objects will become apparent in the course of the detailed description of the invention.

Briefly, in one process of the invention hydrogen sulfide is separated from a normally gaseous hydrocarbon in a feed gas mixture, such as, a sour natural gas or refinery gas, which feed gas mixture contains at least about 3 mole percent of $H_2S$ and is essentially free of water vapor; the feed gas is cooled to a temperature within the range of about —126° F. to about —200° F. at a related pressure within the range of approximately 150 p.s.i.a. and 450 p.s.i.a., said temperature and said pressure being related to produce a system consisting of gaseous hydrocarbon and solid hydrogen sulfide; the solid hydrogen sulfide phase and the gaseous hydrocarbon phase are separated—the gaseous phase has a hydrogen sulfide content lower than that of the feed gas.

Briefly, in a second process of the invention hydrogen sulfide is separated from a feed gas mixture containing at least about 5 mole percent of hydrogen sulfide and being essentially free of water vapor. This feed gas, and cycle gas, if any, is cooled to a temperature in the range of about —80° F. and —120° F. at an elevated pressure such that there is obtained a system consisting of a gaseous hydrocarbon phase having hydrogen sulfide content lower than that of the gas charged and a liquid hydrogen sulfide phase, which phases are then separated. The gaseous hydrocarbon phase, in an operation separate from the feed gas cooling is cooled to a temperature in the range of about —126° F. and about —200° F. at a related pressure of between about 150 and 450 p.s.i.a., said pressure:temperature relation being suitable for producing a system consisting of another gaseous hydrocarbon phase and a solid hydrogen sulfide phase; the other gaseous hydrocarbon phase has a hydrogen sulfide content lower than the gaseous hydrocarbon charged to this cooling operation.

FIRST

Figure 1:
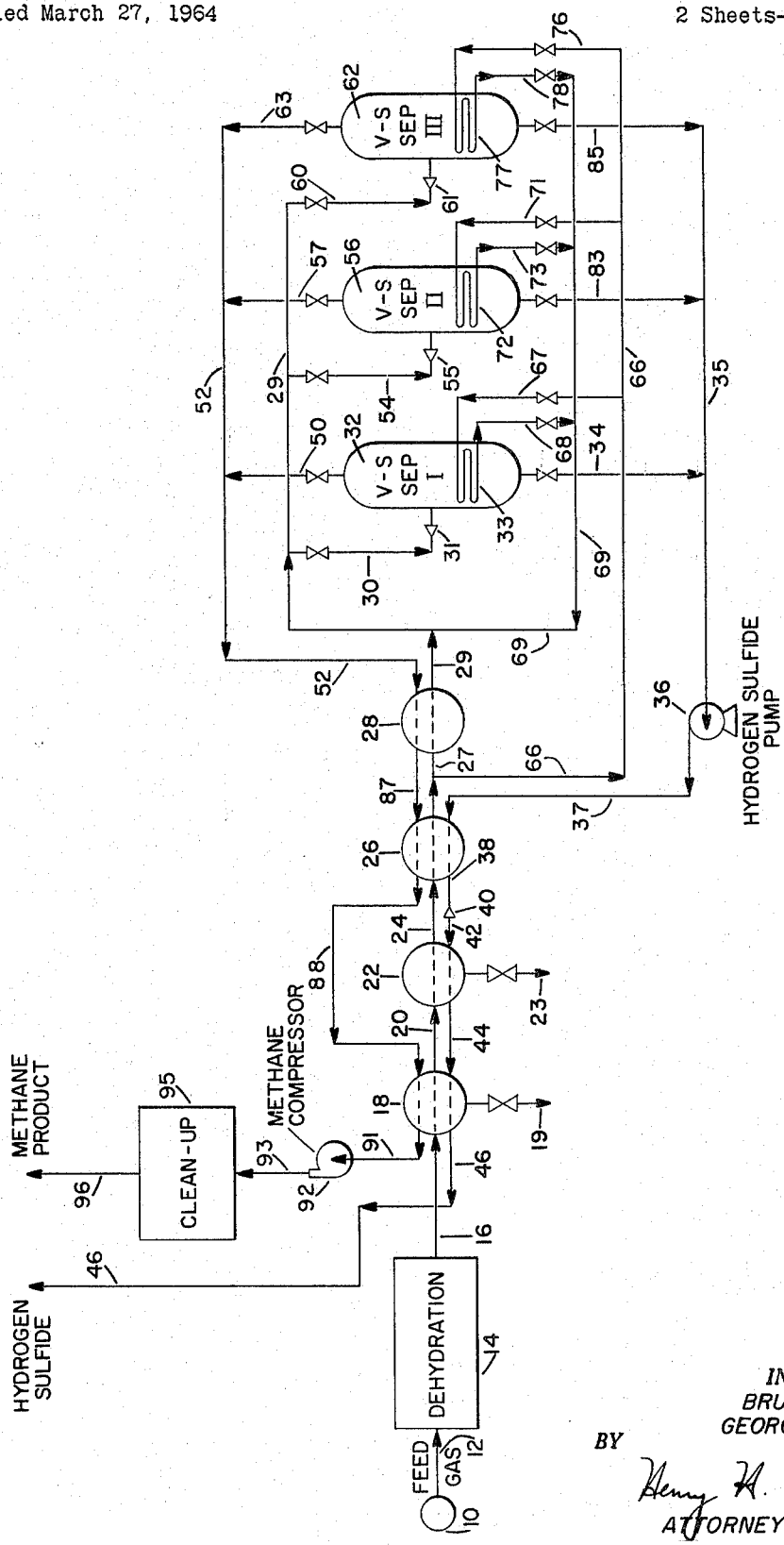
FIGURE 1 shows an embodiment of one process of the invention.

One process of the invention is described in connection with FIGURE 1, which forms a part of this specification. It is to be understood FIGURE 1 is diagrammatic in nature as the individual items of process equipment can be readily compiled and arranged by any one of ordinary skill in this art.

The feed gas is a mixture of hydrogen sulfide and at least one normally gaseous hydrocarbon, usually methane. Pipeline natural gas normally includes methane and ethane hydrocarbons. The as produced natural gas may include methane, ethane, propane and appreciable amounts of butanes and pentanes. In addition to the hydrogen sulfide, carbon dioxide and some nitrogen is frequently present. Refinery gas includes in addition to the saturated hydrocarbons, substantial amounts of unsaturated hydrocarbons. In general refinery fuel gas will have been fractionated to remove the $C_4$ and higher hydrocarbons and substantially all of the $C_3$ hydrocarbons. Normally the feed gas mixture contains methane as the major hydrocarbon constituent.

In this process, the feed gas mixture contains at least about 3 mole percent of hydrogen sulfide. Mixtures containing as much as 90 mole percent of $H_2S$ are known; these may be charged to the process. More commonly, feeds contain about 3–60 mole percent of $H_2S$; the process is particularly adapted for feeds containing above about 10 mole percent, e.g., about 10–60 mole percent of hydrogen sulfide.

In order to avoid clogging of heat exchangers by water freezeout or hydrates, it is necessary that the feed gas be essentially free of water; preferably that it have a water dew point below —100° F. which corresponds to less than 1 part per million of water vapor present. In FIGURE 1, feed gas from source 10 at elevated pressure is passed by way of line 12 to dehydration operation 14 where its water dew point is lowered to the desired level; a water dew point of about —100° F. to —120° F. is suitable.

Dehydrator 14 may be any form of operation which will give the desired dew point, for example a conventional combination of glycol dehydration and solid adsorption or solid adsorption alone.

The dry feed gas is passed in series flow through four heat exchangers by way of line 16, heat exchanger 18, line 20, heat exchanger 22, line 24 heat exchanger 26, line 27 and heat exchanger 28. Herein the dry feed gas is cooled by indirect heat exchange with cold gas and/or cold hydrogen sulfide and/or external refrigeration. It is to be understood this arrangement is a matter of economy and other preliminary cooling means may be used.

The pre-cooled dry feed gas is passed from exchanger 28 by way of line 29 and valved line 30 which includes an expansion valve 31 where the gas is expansion cooled to the desired temperature. The cooled discharge from valve 31 is passed into vapor-solid separator 32.

When the feed gas includes condensible hydrocarbons such as propane, butane, etc., these condense in the exchangers and may be separated by conventional means and withdrawn e.g. by way of valved lines 19 and 23.

It has been discovered that when the cooled dry feed gas is brought to a temperature-pressure relation as hereinafter defined only two phases are present, namely, a solid hydrogen sulfide phase (containing some hydrocarbon) and a gaseous hydrocarbon phase which has a $H_2S$ content lower than that of the feed gas. The temperature of the cooled feed determines largely the amount of hydrogen sulfide in the gaseous hydrocarbon phase. By proper selection of temperature and pressure it is possible to have the $H_2S$ content of the gaseous hydrocarbon phase in all cases be less than 3 mole percent and it can be even lower.

In order to produce a system consisting of a gaseous hydrocarbon and a solid hydrogen sulfide, the cooled gas must have a temperature between about $-126°$ F. and $-200°$ F. and the related pressure must be between approximately 150 p.s.i.a. and 450 p.s.i.a. At lower pressures or higher pressures the desired two phase gas-solid system may not be obtained. The limiting pressures are dependent on the composition of the feed gas; the lower pressure or higher pressure limits might be as much as 100 p.s.i.a. lower or higher than the 150–450 p.s.i.a. pressures stated. At a given pressure, the necessary temperature will vary somewhat dependent on the feed gas composition. In general, the cooling is carried out to result in a cooled gas at a temperature between about $-126°$ F. and $-178°$ F. and at a related pressure of between about 200 p.s.i.a. and 400 p.s.i.a.

Illustrative temperature-pressure relationships are: at about 200 p.s.i.a., the temperature is between about $-126°$ F. and $-178°$ F.; at about 400 p.s.i.a., the temperature is between about $-132°$ F. and $-144°$ F.

In a preferred embodiment of the invention, the feed gas is first cooled to a temperature within the range of about $-117°$ F. and $-126°$ F. at a pressure such that a solid hydrogen sulfide phase does not form; the cooled feed gas system is then expanded through a throttling valve to attain a temperature within the range of about $-126°$ F. to about $-200°$ F. at a related pressure within the range of approximately 150–450 p.s.i.a. so as to produce the aforesaid system consisting of gaseous hydrocarbon and solid hydrogen sulfide.

With a feed gas containing above about 3 mole percent of hydrogen sulfide, a gaseous hydrocarbon phase containing about 2 mole percent of hydrogen sulfide is readily obtained by operating at about 400 p.s.i.a. and at a temperature of about $-132°$ F. and $-144°$ F.

The liquid hydrogen sulfide phase contains some dissolved hydrocarbon. However, under the defined conditions of operation, the hydrocarbon content is low; normally low enough, less than 5 mole percent, to eliminate any need for subsequent further removal of hydrocarbon when the hydrogen sulfide is to be used as a source of elemental sulfur.

In FIGURE 1 a solid hydrogen sulfide, containing some dissolved hydrocarbon, separates in V-S separator 32; is melted by heater 33; and the liquid is withdrawn by way of valved line 34. Here, this stream is passed by way of line 35, pump 36 and line 37 into heat exchanger 26 to help cool the dry feed gas; and is then passed through line 38 and expansion valve 40 and line 42 into heat exchanger 22. Usually the liquid $H_2S$ phase is expanded to about the pressure desired for the $H_2S$ product stream. The $H_2S$ phase is then passed by way of line 44 through heat exchanger 18 and passed out of the system by way of line 46, usually at about atmospheric temperature.

The embodiment of FIGURE 1 utilizes three gas-solid separators in order to maintain a continuous operation. Each being operated on a filling, melting and withdrawal of liquid $H_2S$ cycle.

Sequentially cooled feed is passed from line 29 through valved line 30, expansion valve 31 into V-S separator 32—gas is continuously withdrawn by way of valved line 50 and passed to manifold line 52 while solid hydrogen sulfide is "filling" separator 32. When a sufficient amount of solid has accumulated in separator 32, the cooled stream is passed by way of valved line 54 and expansion valve 55 in V-S separator 56—gas is withdrawn by way of valved line 57. Next feed is passed by way of valved line 60 and expansion valve 61 into V-S separator 62—gas is withdrawn by way of valved line 63.

The solid hydrogen sulfide is melted and withdrawn from each separator as a liquid. However, a separator may be used which would permit continuous operation in a single vessel.

Gas from line 27 is passed by manifold line 66 to heaters positioned with each separator to melt the solid accumulated therein. Gas from line 66 is passed by way of valved line 67, heater 33 in V-S separator 32 and valved line 68 into manifold line 69 which passes the gas into line 29. Gas from line 66 is passed by way of valved line 71, heater 72 in V-S separator 56, and valved line 73 into line 69. Gas from line 69 is passed by way of valved line 76, heater 77 in V-S separator 62, and valved line 78 into line 69. Liquid hydrogen sulfide is withdrawn from V-S separators 32, 56 and 62 by way of valved line 34, 83 and 85, respectively, and passed into manifold line 35.

A gaseous hydrocarbon phase, containing less $H_2S$ than is in the feed gas, is withdrawn overhead sequentially from V-S separators 32, 56 and 62 and passed to line 52 and thence passed through heat exchanger 28. From exchanger 28, the gaseous hydrocarbon phase is passed by line 87 to exchanger 26. The gaseous hydrocarbon phase is passed from exchanger 26 by way of line 88 through exchanger 18, line 91, compressor 92 and line 93 to a $H_2S$ clean-up and dehydration operation 95. Normally the gaseous phase is compressed to pipeline pressure—about 600 p.s.i.a.—but if gas at line 91 pressure is suitable the compressor may be eliminated.

The $H_2S$ clean-up operation 95 may be any one which can produce gas having a hydrogen sulfide content suitable for industrial fuel use which is about the specification for pipeline gas, namely 0.25 grain/100 s.c.f. An amine unit, or a molecular sieve adsorption unit, is illustrative of suitable operation.

The essentially $H_2S$-free gas is passed out of the system by way of line 96.

*Illustration 1*

The operation of this process of the invention is illustrated by a unit charging 200 million s.c.f. of feed gas per stream day. The feed gas is a nautral gas containing 10 mole percent of $H_2S$ and the hydrocarbon is substantially only methane. The feed gas is available at 600 p.s.i.a. and 80° F. temperature.

The feed gas is charged to an alumina or molecular sieve dehydration unit and emerges with a water dew point of $-100°$ F.

The dry feed gas is passed in series through heat exchangers 18, 22 and 26 and is cooled in each exchanger to the temperatures: Exchanger 18, $-38°$ F.; exchanger 22, $-62°$ F.; exchanger 26, $-95°$ F. The temperature of the gas emerging from exchanger 28 is $-117°$ F. The melting point of pure $H_2S$ at 400 p.s.i.a. is $-122°$ F. The gas from line 66 used for melting is returned to line 29 at $-117°$ F. The temperature of the cooled feed emerging from expansion valve 3 is $-140°$ F. at a pressure of 400 p.s.i.a.; the emerging stream consists of solid hydrogen sulfide particles and a gaseous hydrocarbon phase.

The solid hydrogen sulfide phase contains virtually no methane; the liquified $H_2S$ is withdrawn from V-S separators and passed through exchanger 26 and expansion valve 40 where it is dropped to a pressure of 16 p.s.i.a. The gaseous $H_2S$ is then passed through exchangers 22 and 18 and then out of the system at about 16 p.s.i.a. and +65° F.

The gaseous hydrocarbon phase contains 2.0 mole percent of H$_2$S and is withdrawn from V-S separators and passed through exchangers 28, 26 and 18 where it is brought to +70° F. temperature. The gas is raised to pipeline pressure of about 600 p.s.i.a. by compressor 92 and sent to an amine H$_2$S clean-up unit from which it emerges as pipeline gas with respect to H$_2$S and water vapor content.

At 400 p.s.i.a. and a temperature between about −132° F. and −144° F., a gaseous hydrocarbon phase containing about 2 mole percent of H$_2$S is obtained from a feed gas having an H$_2$S content of more than 3 mole percent.

SECOND

This process of the invention is described in connection with FIGURE 2, which forms a part of the specification.

The feed gas here is as defined hereinbefore except that gas contains at least about 5 mole percent of hydrogen sulfide.

Figure 2:
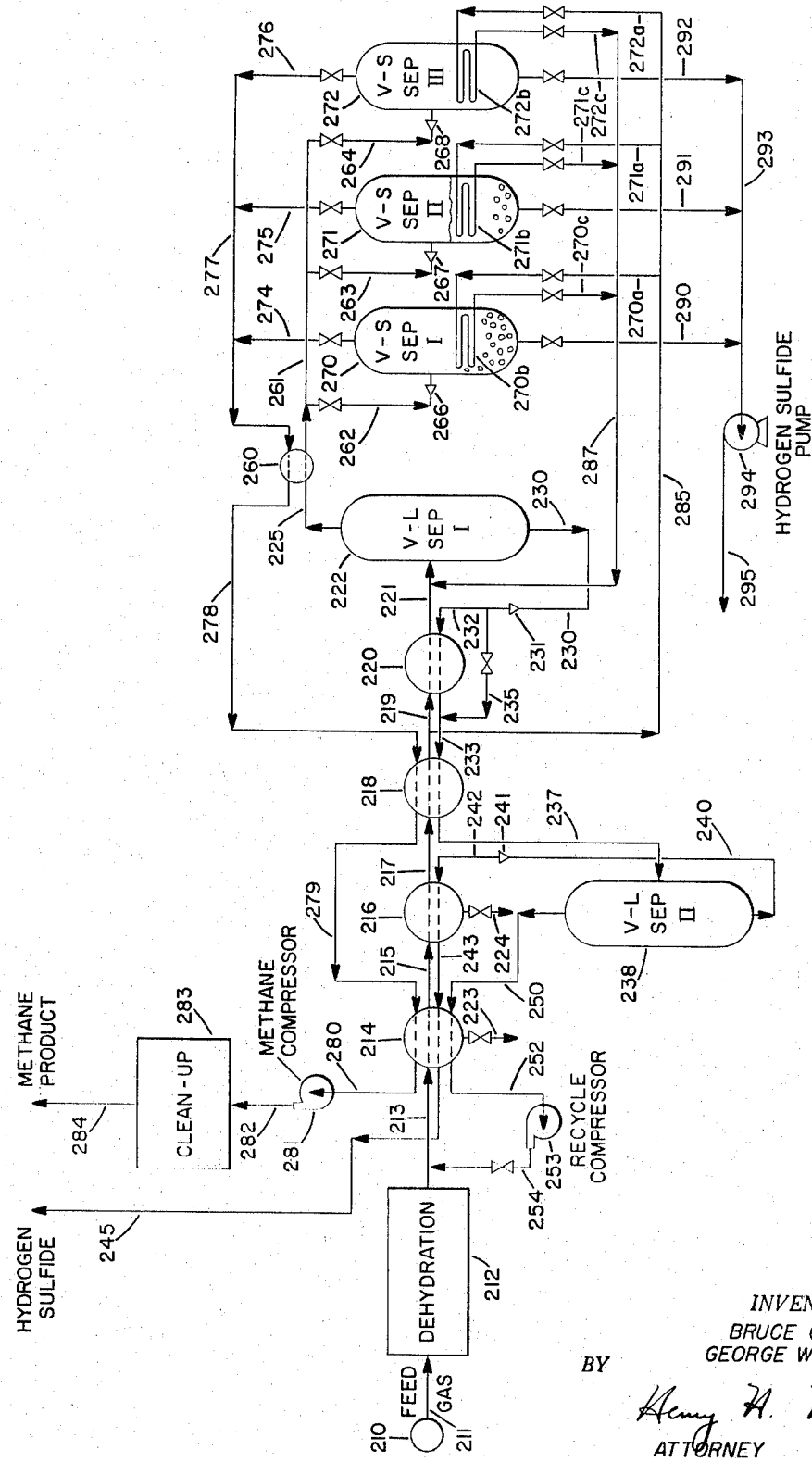
FIGURE 2 shows an embodiment of a second process of the invention.

In FIGURE 2, feed gas at elevated pressure from source 210 is passed by way of line 211 to dehydration unit 212 where its water dew point is lowered to about the cooled feed temperature, suitably a water dew point of about −100° F. The dry feed gas, and cycle gas if any, is passed by way of line 213, through heat exchanger 214, line 215, heat exchanger 216, line 217, heat exchanger 218, line 219, heat exchanger 220 and line 221 into vapor-liquid separator 222.

Any condensible hydrocarbons present in the feed gas may be withdrawn from heat exchangers 214 and 216 by way of valved lines 223 and 224, respectively.

It had been discovered that at a temperature in the range of about −80° F. to about −120° F., at a related elevated pressure, a feed gas containing at least about 5 mole percent of hydrogen sulfide form a system consisting of a gaseous hydrocarbon phase and a liquid phase. The gaseous hydrocarbon phase has a H$_2$S content lower than the H$_2$S content of the gas charged to this cooling; at a given temperature and pressure condition, the H$_2$S content is essentially independent of the H$_2$S content of the gas charged.

With a charge gas containing at least about 5 mole percent of H$_2$S, and particularly above about 10 mole percent of H$_2$S, it is desirable to cool to a temperature of about −80° F. to about −120° F. at a pressure of at least about 200 p.s.i.a.

A gaseous hydrocarbon phase containing some H$_2$S is withdrawn overheaed from V-L separator 222 by way of line 225.

A liquid hydrogen sulfide phase containing some dissolved hydrocarbon is withdrawn from V-L separator 222 and this is passed by way of line 230 and expansion valve 231 where it is expanded to the desired lower temperature and pressure. The expanded stream from valve 231 may be passed entirely by way of line 232 through heat exchanger 220 into line 233. When necessary to control the temperature produced in exchanger 220, a portion of the stream from valve 231 is bypassed by valved line 235 around exchanger 220 and sent directly to line 233. The stream in line 233 is passed through heat exchanger 218 and then by way of line 237 into V-L separator 238.

The cooled liquid H$_2$S phase in line 237 is at a temperature in the range of about −50° F. and about −120° F. and is at a pressure below that in separator 222, desirably at least about 200 p.s.i.a. The temperature of the cooled liquid H$_2$S phase entering separator 238 is determined by the pressure and the desired low hydrocarbon content of the H$_2$S rich stream to be withdrawn from separator 238.

Under the defined conditions of temperature and pressure, there exists in V-L separator 238 another gaseous phase and another liquid phase. The other liquid phase is hydrogen sulfide containing some hydrocarbon—under these conditions this liquid phase is pure enough to be charged to elemental sulfur production or even to many chemical reactions without further removal of hydrocarbons.

The other liquid H$_2$S phase is withdrawn from separator 238 and passed by way of line 240 into expansion valve 241 where it is expanded to the desired pressure for subsequent use—usually close to atmospheric pressure. The expanded stream is passed by way of line 242, exchanger 216, line 243, exchanger 214 and line 245 to storage or disposal.

The other gaseous phase is withdrawn overhead from separator 238 and is passed by way of line 250, exchanger 214, and line 252 to compressor 253, where the stream is raised to the pressure desired for use. The gas stream from compressor 253 may be cycled in whole or in part by way of valved line 254 to line 213 and admixed with the feed gas from source 210 to become the charge gas stream, previously mentioned.

A two stage V-L separation has been described; however, the invention is not limited to a two stage operation, by selecting the proper pressure-temperature conditions, it is possible to operate with only one V-L separation stage.

The gaseous hydrocarbon phase produced in V-L separator 222 is withdrawn by way of line 225 and is passed through heat exchanger 260 into manifold line 261. Valved lines 262, 263 and 264 sequentially pass the stream from line 261 into expansion valves 266, 267 and 268 and thence in V-S separators 270, 271, and 272 respectively. These V-S separators function in the same manner as the V-S separators described in FIGURE 1.

Other cooling means may be used but expansion cooling is preferred because the problems associated with handling solids, such as, solid deposition in lines and exchangers, are avoided.

The cooled stream entering the V-S separators 270, 271 and 272 is at a temperature-pressure relation suitable for producing a gaseous hydrocarbon-solid hydrogen sulfide system; the temperature in the V-S separators is between about −126° F. and −200° F. and the pressure therein is approximately 150 p.s.i.a. and 450 p.s.i.a. Generally, the temperature-pressure relation is at a temperature between about −126° F. and −178° F. and a pressure of between about 200 p.s.i.a. and 400 p.s.i.a. This relation is described in more detail in connection with FIGURE 1.

The other gaseous hydrocarbon phase produced in the V-S separators has a hydrogen sulfide content lower than the gaseous hydrocarbon produced in V-L separator 222 and charged to this separate cooling operation of exchanger 260 and expansion 266. This other gaseous hydrocarbon is sequentially withdrawn from the V-S separators 270, 271, and 272 by way of valved lines 274, 275 and 276 and passed to manifold line 277, thence through exchanger 260, line 278, exchanger 218, line 279, exchanger 214, line 280, gas compressor 281, and line 282 to H$_2$S clean-up operation 283. The gas product is passed to use by way of line 284.

Gas from line 219 is used to melt the solid hydrogen sulfide accumulated in the V-S separators. This gas is passed by manifold line 285 through valved line 270a, heater 270b and returned by line 270c (see V-S separator 270) to manifold line 287. Also through valved line 271a, heater 271b, and valved line 271c (see V-S separator 271) to line 287. Also through valved line 272a, heater 272b, and valved line 272c (see V-S separator 272) to line 287. From line 287, the stream is returned to line 221.

The liquid hydrogen sulfide product is withdrawn from the V-S separators by way of valved lines 290, 291, and 292 respectively to line 293 and is passed by pump 294 and line 295 to storage or use, not shown.

ILLUSTRATION

The operation of the second process of the invention is illustrated by a unit charging 200 million s.c.f. of feed gas from source 210 per stream day—527 thousand moles; which feed gas is a natural gas containing 25 mole percent of $H_2S$ and the hydrocarbon is substantially only methane.

The feed gas is dehydrated to a dew point of —100° F. by passage through an alumina unit.

The feed gas is at 600 p.s.i.a.; it is passed through heat exchangers 214, 216, 218 and 220 and enters into V-L separator 222 at substantially 600 p.s.i.a. The feed gas is at 80° F. and emerges from the exchangers at these temperatures; exchanger 214, —4° F.; exchanger 216, —62° F.; exchanger 218, —88° F. The recombined stream from lines 221 and 285 enters separator 222 at —100° F. and 600 p.s.i.a.

A gaseous hydrocarbon phase is withdrawn from separator 222 (this gaseous phase contains 4.5 mole percent of $H_2S$) and is passed through exchangers 260 and line 261 into line 262, 263 and 264 in sequence.

A liquid hydrogen sulfide rich phase, is withdrawn from separator 222. This stream contains 10.1 mole percent of dissolved hydrocarbon. After passing through expansion valve 231, the temperature is lowered to —120° F. at 200 p.s.i.a. After heat exchange in exchangers 220 and 218, the stream is passed into V-L separator 238 at —40° F. and substantially 200 p.s.i.a.

There exists in V-L separator 238 another gaseous hydrocarbon phase having a $H_2S$ content of 13 mole percent. This other gaseous phase is withdrawn, compressed to 600 p.s.i.a by compressor 294 and admixed with the natural gas charge from 210 to give a combined gas stream having a $H_2S$ content of 24.8 mole percent.

The other liquid hydrogen sulfide rich phase contains 1.8 mole percent of hydrocarbon and is passed out of the system at 22 p.s.i.a. and 50° F.; it amounts to 115 thousand moles.

Under the above conditions of operation, it has been observed that a feed gas containing 5 or more mole percent of $H_2S$ produces a gaseous hydrocarbon phase in line 225 having 4.6–4.9 mole percent of $H_2S$, i.e., less than 5 mole percent.

The gaseous hydrocarbon phase from V-L separator 220 cooled in exchanger 260, passed through expansion valve 266 and enters V-S separator 270 at —170° F. and 200 p.s.i.a. Two phases are present in V-S separator 270; another gaseous hydrocarbon phase having an $H_2S$ content of 0.7 mole percent and another solid hydrogen sulfide phase, which is virtually pure $H_2S$. This other solid hydrogen sulfide is melted—M.P. —120° F. at 200 p.s.i.a.—and withdrawn from the unit by way of lines 290, 293, pump 294 and line 295.

The other gaseous hydrocarbon phase is passed by way of line 274, line 277, exchange 260 and so on to clean-up operation 283. An amine unit brings the hydrogen sulfide and water levels to pipeline shipping requirements.

Thus having described the invention, what is claimed is:

1. A low temperature process for separating hydrogen sulfide from a normally gaseous hydrocarbon which process comprises:
    cooling a feed gas mixture of hydrogen sulfide and at least one normally gaseous hydrocarbon, said feed containing about 3–90 mole percent of hydrogen sulfide and methane as the major hydrocarbon constituent and being essentially free of water vapor, to produce a system consisting of gaseous hydrocarbon and solid hydrogen sulfide, said cooling being carried out to a temperature between about —126° F. and —200° F. and at a pressure between approximately 150 p.s.i.a. and 450 p.s.i.a.; such that said gas-solid system is formed; and
    separating said gaseous hydrocarbon phase which has a hydrogen sulfide content lower than said feed, from said solid hydrogen sulfide phase.

2. The process of claim 1 wherein said pressure is about 200 p.s.i.a. and said temperature is between about —126° F. and —178° F.

3. The process of claim 1 wherein said pressure is about 400 p.s.i.a. and said temperature is between about —132° F. and —144° F.

4. A low temperature process for separating hydrogen sulfide from admixture with natural gas which process comprises:
    cooling a natural gas feed mixture containing about 3–60 mole percent of hydrogen sulfide and having a water dew point below about —100° F., to a temperature within the range of about —126° F. and about —178° F., at a pressure of between about 200 p.s.i.a. and 450 p.s.i.a., said temperature and pressure being related to produce a system consisting of gaseous hydrocarbon and solid hydrogen sulfide; and
    separating said gaseous hydrocarbon phase, which has a hydrogen sulfide content lower than said natural gas feed, from said solid hydrogen sulfide phase.

5. The process of claim 4 wherein said feed contains about 10–60% of hydrogen sulfide, said temperature-pressure conditions are about —132° F. to —144° F. and about 400 p.s.i.a., and said gaseous hydrocarbon phase contains about 2 mole percent of hydrogen sulfide.

6. The process of claim 4 wherein said feed contains about 4.5 mole percent of hydrogen sulfide, said temperature is about —170° F., said pressure is about 200 p.s.i.a. and said gaseous hydrocarbon phase contains less than about 1 mole percent of hydrogen sulfide.

7. A low temperature process for separating hydrogen sulfide from a natural gas which process comprises:
    cooling a natural gas feed containing about 5–60 mole percent of hydrogen sulfide and being essentially free of water vapor, to a temperature in the range of about —80° F. and —120° F. at a pressure of at least about 200 p.s.i.a., to obtain a system consisting of gaseous hydrocarbon and liquid hydrogen sulfide;
    separating said liquid hydrogen sulfide phase from said gaseous hydrocarbon phase, which contains hydrogen sulfide in an amount less than said feed;
    cooling by expansion, in an operation separate from said feed cooling, said gaseous hydrocarbon phase to obtain a system consisting of gaseous hydrocarbon and solid hydrogen sulfide, said other cooling being to a temperature between about —126° F. and —178° F. and a pressure of between about 200 p.s.i.a. and 400 p.s.i.a.; and
    separating said other gaseous hydrocarbon phase, which has a lower hydrogen sulfide content than said gaseous hydrocarbon phase, from a solid hydrogen sulfide phase.

8. The process of claim 7 wherein said gas feed is cooled at essentially constant pressure of about 600 p.s.i.a. to a temperature of about —100° F.; a liquid $H_2S$ phase separated from a gaseous hydrocarbon phase containing about 5% $H_2S$; cooling said gaseous phase to a temperature of about —170° F. at a pressure of about 200 p.s.i.a. to obtain another gaseous hydrocarbon phase containing about 1% of $H_2S$ and a solid hydrogen sulfide phase.

References Cited by the Examiner

UNITED STATES PATENTS

| | | | |
|---|---|---|---|
| 2,900,797 | 8/1959 | Kurata et al. | 62—12 |
| 2,901,326 | 8/1959 | Kurata et al. | 62—12 X |
| 3,203,192 | 8/1965 | Tafrashi | 62—12 |
| 3,224,208 | 12/1965 | Schlumberger et al. | 62—23 X |

FOREIGN PATENTS 696,880   10/1927   Canada.

NORMAN YUDKOFF, *Primary Examiner.*

V. W. PRETKA, *Assistant Examiner.*